United States Patent [19]

Branen

[11] 3,913,108

[45] Oct. 14, 1975

[54] RADOME FORMED OF CURABLE BILLET AND WOUND TAPE

[75] Inventor: Kenneth E. Branen, Hudson, N.H.

[73] Assignee: Avco Corporation, Cincinnati, Ohio

[22] Filed: July 19, 1974

[21] Appl. No.: 490,094

[52] U.S. Cl. ................................. 343/872; 156/173
[51] Int. Cl.² ......................................... H01Q 1/42
[58] Field of Search ............. 343/872, 873; 156/173

[56] References Cited
UNITED STATES PATENTS

| | | | |
|---|---|---|---|
| 3,082,134 | 3/1963 | Wentz | 343/872 |
| 3,616,140 | 10/1971 | Copeland et al. | 343/872 |
| 3,780,661 | 12/1973 | Clark | 343/872 |

*Primary Examiner*—Eli Lieberman
*Attorney, Agent, or Firm*—Charles M. Hogan, Esq.; Abraham Ogman, Esq.

[57] ABSTRACT

A unitary radome fabricated by winding a tape of curable material about a mandrel and a portion of a partially cured billet. The radome is final cured and machined to produce a smooth surfaced, unitary and homogenous structure.

4 Claims, 2 Drawing Figures

U.S. Patent  Oct. 14, 1975  3,913,108
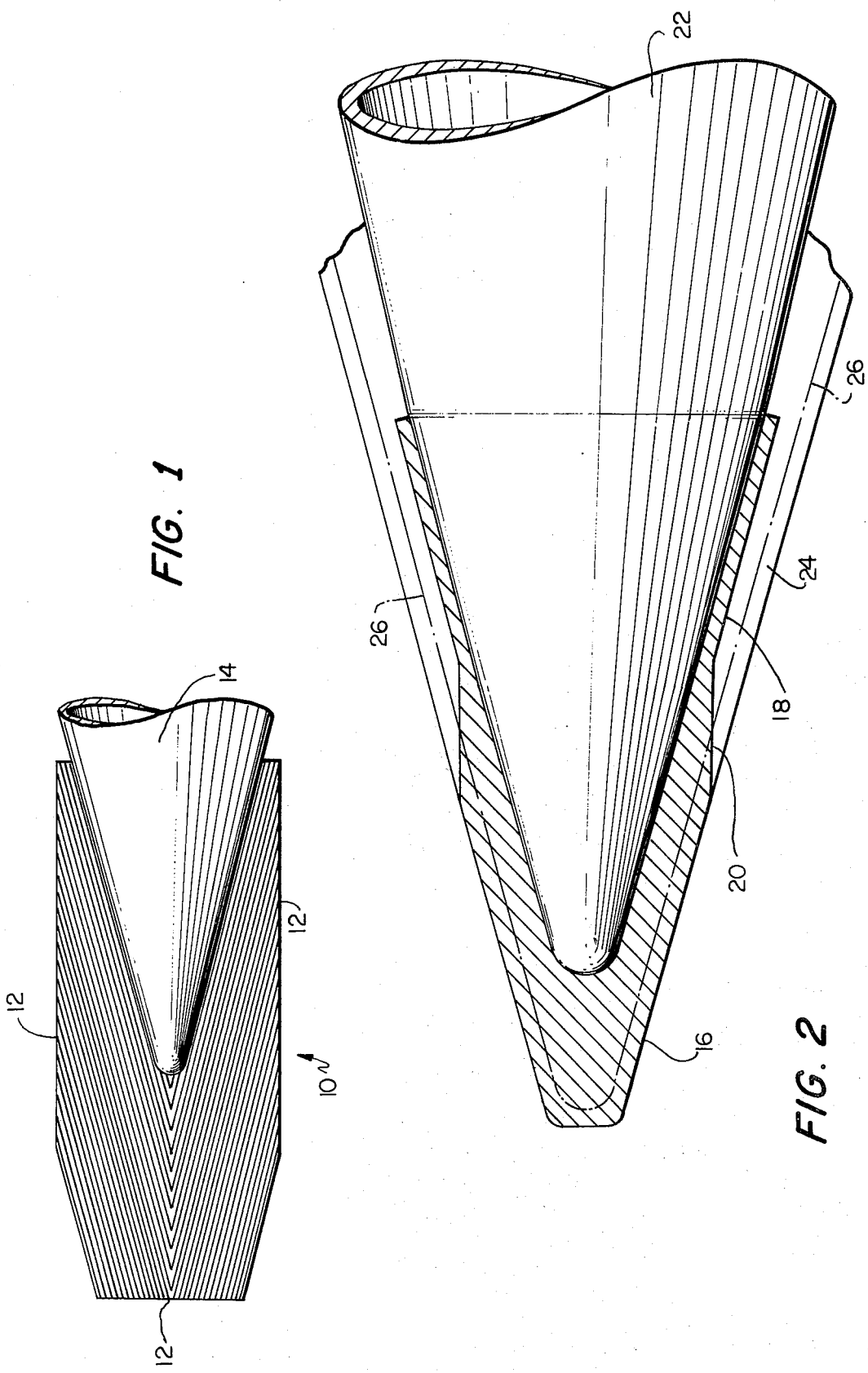

RADOME FORMED OF CURABLE BILLET AND WOUND TAPE

BACKGROUND OF THE INVENTION

1. Field of the Invention

The present invention relates generally to radomes and a method of fabrication and more particularly to a radome form as a unitary, homogenous structure.

2. Description of the Prior Art

A radome is generally a housing which is transparent to electromagnetic radiation at microwave frequencies and is designed to protect the antenna of radar apparatus from external influences, such as windloading, moisture and the like. To minimize electrical distortion, radome must be as thin as possible within the constraints of the strength requirements, homogenous, and of uniform thickness.

Radomes have been made by molding conventional woven fiberglass cloth over a form and coating the cloth with liquid resin which is subsequently cured. This method is slow and produces undesirable overlaps or wrinkles which effect the electrical characteristics of the radome. To overcome the problems of the woven cloth fabrication technique, radomes have been formed by winding a fine fiberglass strand or roving around a mandrel and bonding the final structure with the resin. This method has also been found to be time consuming and expensive. A third method of forming a radome involves the use of applying strips of epoxy fiberglass prepreg to a mandrel by hand. This method is not only slow (and thus expensive), but does not produce a repeatable radome structure. Similar to the first method, the hand lay-up technique produces undesirable seams which effect the final electrical characteristics of the radome.

SUMMARY OF THE INVENTION

The present invention provides a method for fabricating a unitary homogenous radome structure which is economical and repeatable. A plurality of conical shaped layers of curable material are partially cured at compression molding to form a billet. The billet is then machined to produce a reduced thickness exterior surface which is parallel to the remaining exterior surface of the billet. The parallel surfaces of the billet are connected by a sloping exterior surface. The billet, which becomes the nose or apex of the radome is applied to a mandrel. A continuous strip of curable material is wound about the mandrel and the reduced exterior surface of the billet. The final structure including the wound strip material and the billet are finely cured to form a unitary homogenous structure. The cured structure is machined to produce a substantially smooth surface of uniform thickness. By using a performed billet as the nose portion of the radome, the problems of the prior art in producing a homogenous uniform thickness nose section is eliminated.

OBJECTS OF THE INVENTION

An object of the present invention is to provide an integral homogenous uniformly thick radome structure and method of fabrication.

Another object of the present invention is to provide a method for fabricating radome which is economical.

A further object of the invention is to provide a method which will provide repeatable, reliable radome structures.

Still another object of the invention is to provide a method for forming radomes having structural stability while minimizing electrical interference.

Other objects, advantages and novel features of the present invention will become apparent from the following detailed description of the invention when considered in conjunction with the accompanying drawings.

BRIEF DESCRIPTION OF THE DRAWINGS

FIG. 1 is a sectional view of the initial steps in carrying out the method of the present invention;

FIG. 2 is a sectional view of the remaining steps in carrying out the method of the present invention.

DESCRIPTION OF THE PREFERRED EMBODIMENTS

The radome fabricated by the method of the present invention consists essentially of two starting elements, i.e. a partially cured machined billet and a tape of curable material to be wound around a mandrel and the billet. The billet 10 is formed, as shown in FIG. 1, by placing a plurality of conically shaped elements of curable material 12 on a form 14. The billet 10 is then partially cured by compression molding, for example, to form a single unit which may be easily handled. The angle of the apex of the conical elements 12 should be chosen so as to be very close to the final angle of the nose of the finally produced radome. The angle of the apex is shown in FIG. 1 and is approximately 30°. The form 14 produces the desired interior configuration of the billet 10 in the final radome. The mandrel, to be discussed later, has an identical shape to the form 14 and the form 14 may constitute the mandrel if appropriate.

The partially cured billet 10 is machined to produce the configuration shown in FIG. 2. The machined billet has two generally parallel surfaces 16 and 18 connected by an inclined exterior surface 20. The machined, partially cured billet 10 is mounted on a mandrel 22 and held in place thereon by a chuck or fastening means partially encompassing section 16.

A continuous tape of curable material is then wound around the mandrel starting at the large diameter of the mandrel down to and including surfaces 18, and 20, of the billet 10 to form section 24 of the radome. During the winding of the tape, pressure and heat is applied by a compaction roller.

After the tape has been wound tightly on the mandrel and the billet, the total radome is finally cured in super steam under pressure in an autoclave, for example. The radome is finally cured as an integral homogenous structure without bonded joints. The Cured radome is then machined down to a line indicated as 26 in FIG. 2, to produce a relatively smooth surfaced uniformly thick radome. Similarly, the interior of the radome may be machined if the final desired configuration is different from the wrapped configuration.

A radome fabricated according to the method of the present invention was made using a curable material of an epoxy pre-preg E293TC, available from Ferro Corporation, Composite Division, Norwalk, Conn. The billet is formed using 1,000 psi compression molding. A 4-inch wide warp tape of the same material was used as a wrapping tape. The wound billet and tape were cured at 350° at 80 psi in a vacuum and post cured at 400°F. A winding angle of 0° to the surface of the mandrel was used, though angles up to 15° are possible. Other curable materials are for example, a carbon fabric phenolic, a silica fabric phenolic, quartz fabric phenolics, rubberized silica fabric phenolics as well as epoxy glass systems.

From the preceding description of the preferred embodiments, it is evident that the objects of the invention are attained to produce a repeatable, integrally formed, homogenous radome. Although the invention has been described and illustrated in detail, it is to be fully understood that the same is by way of illustration and example and is not intended to be taken by way of limitation. Though some of the steps involve the formation of surfaces by compression molding onto a form and winding onto a mandrel, the configurations may be altered for the desired radome structure by well known machining processes. The spirit and scope of this invention are limited only by the terms of the appended claims.

What is claimed:
1. A radome having a substantially conical shape comprising:
   a substantially hollow billet forming the apex of the radome, said billet having front and rear portions, said rear portion being defined by a reduced thickness;
   a tape material wound to form the remainder of the radome overlapping the rear portion of the billet; and
   the billet and the tape form a cured homogenous radome.
2. The radome of claim 1 wherein the exterior surface of said reduced thickness section is substantially parallel to the exterior surface of the remainder of said billet and joined by an exterior surface sloped relative to the parallel exterior surfaces.
3. The radome of claim 1 wherein the angle of said apex is approximately 30°.
4. A radome as defined in claim 1 wherein said billet is configured from a plurality of superimposed conically shaped layers of material.

* * * * *